(12) United States Patent
Chen et al.

(10) Patent No.: US 8,996,426 B2
(45) Date of Patent: Mar. 31, 2015

(54) BEHAVIOR AND INFORMATION MODEL TO YIELD MORE ACCURATE PROBABILITY OF SUCCESSFUL OUTCOME

(75) Inventors: Kay-Yut Chen, Santa Clara, CA (US); Cipriano A. Santos, Modesto, CA (US); Maria Teresa Gonzalez Diaz, Mountain View, CA (US); Xin Zhang, San Jose, CA (US); Shailendra K. Jain, Sunnyvale, CA (US); Jerry Z. Shan, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 279 days.

(21) Appl. No.: 13/039,202

(22) Filed: Mar. 2, 2011

(65) Prior Publication Data

US 2012/0226640 A1   Sep. 6, 2012

(51) Int. Cl.
 *G06F 15/18*   (2006.01)
 *G06N 7/00*   (2006.01)

(52) U.S. Cl.
 CPC ..................................... *G06N 7/005* (2013.01)
 USPC .......................................................... 706/12

(58) Field of Classification Search
 CPC ........................................................ G06F 15/18
 See application file for complete search history.

(56) References Cited

U.S. PATENT DOCUMENTS

| | | | |
|---|---|---|---|
| 7,072,863 B1 * | 7/2006 | Phillips et al. | 705/36 R |
| 7,577,246 B2 | 8/2009 | Idan et al. | |
| 7,797,188 B2 | 9/2010 | Srivastava | |
| 8,291,069 B1 * | 10/2012 | Phillips | 709/224 |
| 2005/0131710 A1 * | 6/2005 | Sahagian | 705/1 |
| 2006/0106664 A1 | 5/2006 | Peters et al. | |
| 2007/0203785 A1 * | 8/2007 | Thompson et al. | 705/10 |
| 2008/0097884 A1 * | 4/2008 | Ferris | 705/36 R |
| 2009/0292588 A1 | 11/2009 | Duzevik et al. | |
| 2009/0319344 A1 | 12/2009 | Tepper et al. | |
| 2011/0125671 A1 * | 5/2011 | Zhang et al. | 705/36 R |

OTHER PUBLICATIONS

Predicting the Future: Chen, 2003, Kluwer Academic Publishers, Information Systems Frontiers 5:1 pp. 47-61.*
D. Evans et al., "Are motivational biases adaptive? An agent-based model of human judgement under uncertainty," Research paper apparently dated Jan. 23, 2011, and available at Internet web site http://ebookbrowse.com/bias-pdf-d53490812.

* cited by examiner

*Primary Examiner* — Kakali Chaki
*Assistant Examiner* — Peter Coughlan
(74) *Attorney, Agent, or Firm* — Law Office of Micahel A. Dryja

(57) ABSTRACT

A report indicating a user-reported probability of a successful outcome is received. A behavior and information model is estimated based on the report. The behavior and information model includes a behavior model component having a bias parameter and a consistency parameter. The behavior and information model includes an information model component having a first user-believed probability of a successful outcome and a second user-believed probability of a successful outcome. The behavior and information model is used to yield a model-determined probability of a successful outcome that more accurately reflects a probability of a successful outcome than the user-reported probability of a successful outcome does.

13 Claims, 3 Drawing Sheets

BEHAVIOR AND INFORMATION MODEL TO YIELD MORE ACCURATE PROBABILITY OF SUCCESSFUL OUTCOME

BACKGROUND

Salespeople in organizations typically have to report the deals that they are currently pursuing so that, for instance, the organizations can project or forecast likely income at any given time. A salesperson may report the progress of a deal periodically, such as when new information is received from a potential customer, and including up to the time when the deal is won or lost. Each time the salesperson reports the progress of a deal, the person may be asked to indicate in his or her estimate the probability that the deal will ultimately be won.

DETAILED DESCRIPTION

Figure 1:
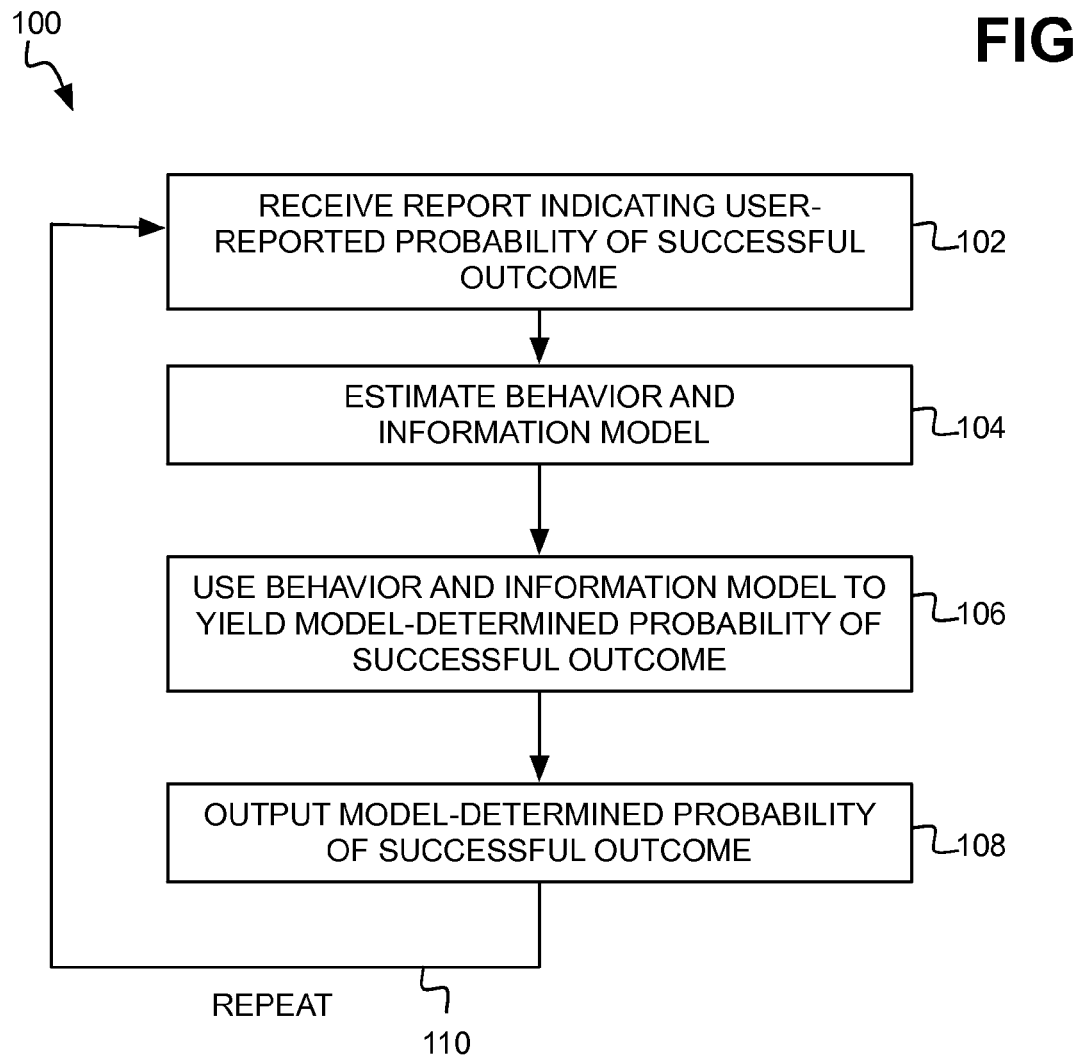
FIG. 1 is a flowchart of an example method for determining a probability of a successful outcome that is more accurate than a user-reported probability of a successful outcome.

As noted in the background, salespeople may periodically report the progress of the deals that they are pursuing, including indications of the probabilities that the deals will ultimately be won. However, such a user-reported probability of a successful outcome (i.e., winning) may not accurately reflect the actual user-known (i.e., user-believed) probability of a successful outcome. A given salesperson may bias his or her user-reported probability of a successful outcome upwards or downwards, owing to various incentives that are in place. Furthermore, a given salesperson may be inconsistent (i.e., irrational) in how he or she provides the user-reported probability of a successful outcome across progress updates, and between different deals.

Determining what a salesperson actually knows (i.e., actually believes) insofar as the probability of a successful outcome a deal is concerned is intractable. This is because the salesperson him or herself may not even be aware of the bias and inconsistency with which the salesperson provides progress updates. As such, asking a salesperson to provide consistent progress updates as to the probability of a successful outcome a deal, without bias, is insufficient to actually obtain this information.

Disclosed herein are techniques to better estimate the user-known (i.e., user-believed) probability of winning a deal, based on the user-reported probability of winning the deal. More generally, techniques are disclosed herein for better estimating the user-known (i.e., user-believed) probability of a successful outcome, based on the user-reported probability of a successful outcome. A report indicating a user-reported probability of a successful outcome is received. A behavior and information model is estimated based on this report.

The behavior and information model includes a behavior model component and an information model component. The behavior model component has a bias parameter and a consistency parameter. The bias parameter can indicate user bias in providing the user-reported probability of a successful outcome. The consistency parameter can indicate user consistency in providing the user-reported probability of a successful outcome.

The information model component has a first user-believed probability of a successful outcome and a second user-believed probability of a successful outcome, both of which are unobservable. The first user-believed probability of a successful outcome can indicate an actual user-believed probability of a successful outcome (e.g., where a deal is ultimately won). The second user-believed probability of a successful outcome can indicate an actual user-believed probability of a successful outcome for an ultimate losing outcome (where a deal is ultimately lost).

The behavior and information model is used to yield a model-determined probability of a successful outcome. The model-determined probability of a successful outcome more accurately reflects the probability of a successful outcome than the user-reported probability of a successful outcome. The model-determined probability of a successful outcome can be conceptualized as the user-known (i.e., user-believed) probability of a successful outcome. In this way, the techniques disclosed herein provide a way to estimate this user-known (i.e., user-believed) probability of a successful outcome, which is in actuality unobservable, based on the user-reported probability of a successful outcome.

FIG. 1 shows an example method 100 for estimating a user-known (i.e., user-believed) probability of a successful outcome that is otherwise directly unobservable and directly undeterminable. The method 100 can be performed by a processor. For example, a non-transitory computer-readable data storage medium can store a computer program that when executed by a processor results in the method 100 being performed.

A report indicating a user-reported probability of a successful outcome is received (102). The report may be obtained by periodically sampling a system in which users report such probabilities of a successful outcome, such as for deals. For instance, the system may just store the most recent user-reported probability of winning for a deal. Therefore, the system may be periodically sampled for each deal, to determine whether the user has updated the user-reported probability of a successful outcome. Alternatively, the system may generate an interrupt-like event when the user has updated the user-reported probability of a successful outcome.

The user-reported probability of a successful outcome is ideally but unlikely equal to the user-known (i.e., user-believed) probability of a successful outcome. The user-reported probability of a successful outcome varies from the user-known (i.e., user-believed) probability in a successful outcome in that the former is subject to bias and inconsistency of the user. Indeed, as noted above, the user may not actually be consciously cognizant of his or her known (i.e., believed) probability of a successful outcome.

A behavior and information model is estimated based on the report (104). The behavior and information model includes two components: a behavior model component, and an information model component. Each of the behavior model component and the information model component may be considered as a separate model, both of which are then joined together within the behavior and information model itself.

The behavior model component models the behavior of the user in reporting the user-reported probability of a successful outcome. The example method 100 does not have knowledge, for instance, of any incentives with respect to how salespeople, or other users, provide this information. As to the sales process in particular, this process is complicated, and salespeople are rewarded primarily on their sales performance. Furthermore, the example method 100 does not have knowledge of tacit incentives that may be relevant in the salespeople providing their user-reported probabilities of a successful outcome, such as verbal encouragement and evaluation from their superiors, for instance.

Within a supply chain environment, it has been shown that individuals have an aversion to lie (i.e., deviate from their beliefs), even if there is strong incentive to do so. This aversion can be modeled as a disutility that penalizes user-provided reports that deviate from the actual beliefs of the users. The behavior model component captures this disutility, as well as any incentive to bias the report upwards or downwards.

As such, the behavior model component includes a bias parameter that indicates user bias in providing the user-reported probability of a successful outcome. The bias parameter can be determined based on an expected utility calculation that involves a Brier scoring rule. The bias parameter may be represented mathematically as $\lambda$, which accounts for any systemic incentive to bias a report upwards or downwards. If the bias parameter is zero, then there is no bias. If the bias parameter is greater than zero, then there is an incentive to report a higher probability of a successful outcome than the user-believed probability of a successful outcome. If the bias parameter is less than zero, then there is an incentive to report a lower probability of a successful outcome than the user-believed probability of a successful outcome.

The Brier score can be expressed mathematically as Brier Score=$1-(x-\text{report})^2$, where x is equal to one if the deal (or other transaction) is ultimately won, and is equal to zero if the deal (or other transaction) is ultimately lost. Furthermore, report refers to the user-reported probability of a successful outcome. The expected utility calculation can then be expressed as $EU(p,\text{report})=p(1-(\text{report})^2)+(1-p)(1-\text{report}^2)+\lambda\text{report}$, where p is the actual true user-known (i.e., user-believed) probability of a successful outcome. Thus, where the bias parameter $\lambda$ is zero, then the true belief p is the sole solution that maximizes the Brier score.

It has also been shown that people are bounded rational. To model this bounded rationality, the behavior model component includes a consistency parameter that indicates user consistency in providing the user-reported probability of a successful outcome. The consistency parameter can be modeled using a probabilistic choice approach. For instance, the choice probability can be expressed by a multinomial logit distribution $$Pr(p, \text{report}) = \frac{\exp(\gamma EU(p, \text{report}))}{\sum \exp(\gamma EU(p, \text{report}))},$$

where Pr is the choice probability, and $\gamma$ is the consistency parameter.

When the consistency parameter is equal to zero, the user randomly chooses the user-reported probability of a successful outcome, with equal probability for all possible choices. As the consistency parameter approaches infinity, the user makes his or her choice with the highest utility (i.e., accuracy) with 100% probability. As such, the utility maximization model can be considered as a special case of this probabilistic choice model, where the consistency parameter can be interpreted as the degree of rationality. The user is completely irrational, random, and inconsistent at $\gamma=0$, and is completely rational, non-random, and consistent as $\gamma \to \infty$.

The information model component of the behavior and information model models the fact that the actual user-known (i.e., user-believed) probability of a successful outcome is directly unobservable and thus directly unknowable. It cannot be inferred whether a given report received from a user is accurate based on direct observations of the user. Stated another way, what the user knows consciously or subconsciously as to the probability of a successful outcome cannot be gleaned from direct observations (i.e., measurements).

The information model component includes a first user-believed probability of a successful outcome and a second user-believed probability of a successful outcome, both of which are unobservable. The first user-believed probability of a successful outcome indicates the actual user-believed (i.e., user-known) probability of a successful outcome for an ultimate winning outcome. For instance, a salesperson may be pursuing a deal that is ultimately closed, and thus is won. The second user-believed probability of a successful outcome indicates the actual user-believed (i.e., user-known) probability of winning for an ultimate losing outcome. For instance, a salesperson may be pursuing a deal that is ultimately not closed, and thus is lost.

The information model component thus assumes that the user has different information when he or she is encountering a transaction, such as a deal, that is eventually won, as compared to when the user is encounter a transaction that is eventually lost. The first user-believed probability of a successful outcome may be expressed as $P_h$, whereas the second user-believed probability of a successful outcome may be expressed as $P_l$. The information model component can as one example assume that both these probabilities are constant across a set of reports, or a subset of the reports, which permits their inference even though the probabilities are unobservable.

Figure 2:
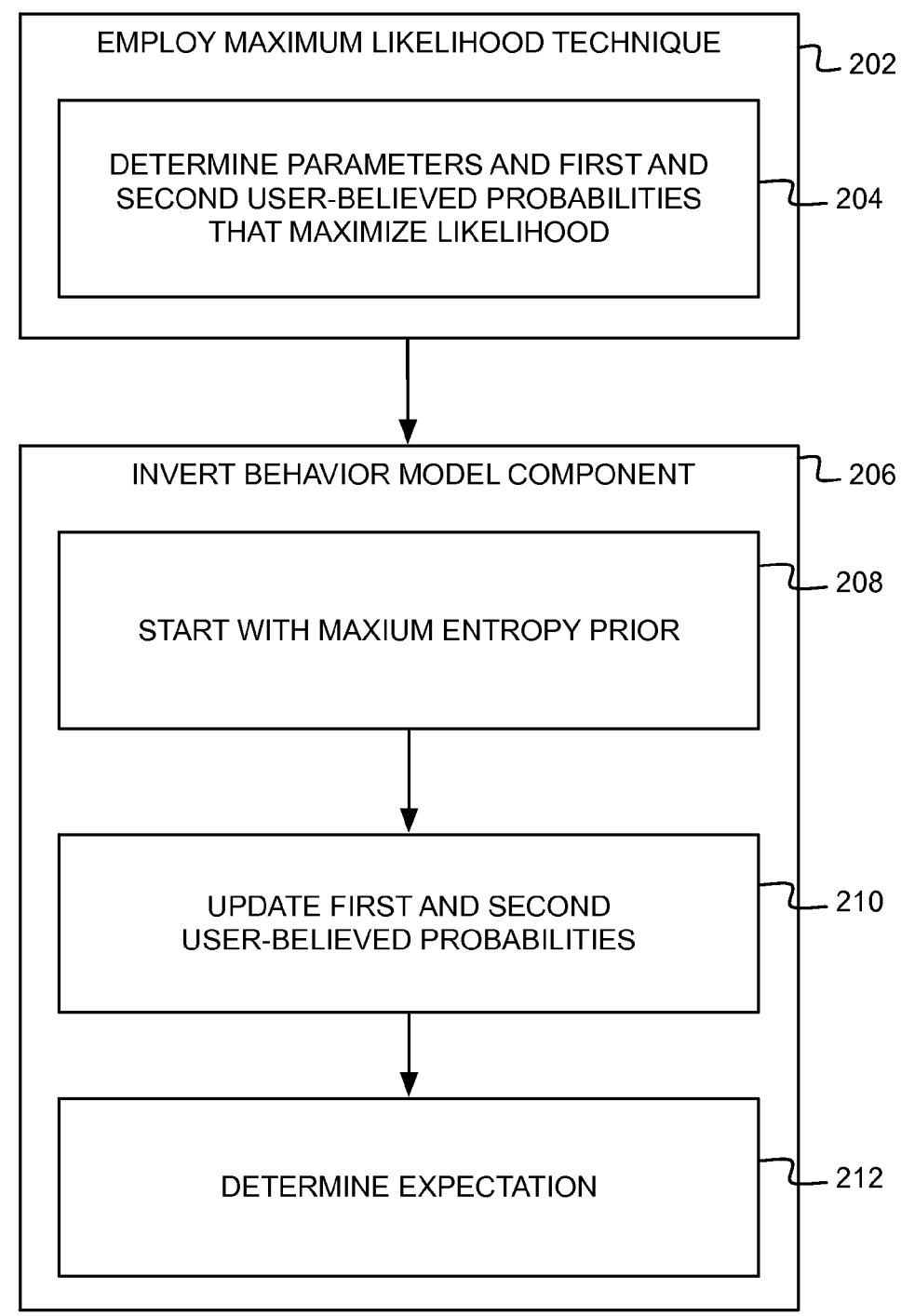
FIG. 2 is a flowchart of an example method for estimating a behavior and information model, and which can be used in the example method of FIG. 1.

FIG. 2 shows an example method 200 by which the behavior and information model can be estimated in part 104 of the method 100. A maximum likelihood technique can be employed (202). For instance, the bias parameter and the consistency parameter of the behavior model component, and the first user-believed probability and the second user-believed probability of the information model component, can be determined as the values that maximize a likelihood (204).

More specifically, given the set of parameters ($\gamma,\lambda,P_h,P_l$), the likelihood is a recovered probability $P_{rev}$ for an ultimate winning outcome, and $1-P_{rev}$ for an ultimate losing outcome. The behavior and information model is thus estimated by determining the set of parameters ($\gamma,\lambda,P_h,P_l$) that maximize this likelihood. The recovered probability $P_{rev}$ is a model-determined (i.e., estimated) probability of a successful outcome that reflects the actual user-known (i.e., user-believed) probability of a successful outcome more than the user-reported probability of a successful outcome does.

The example method 200 may use a Bayesian approach to invert the Behavior model component so that this maximum likelihood technique can be employed (206). Given the set of probabilities($P_h,P_l$), the Bayesian approach starts with a maximum entropy prior having a uniform distribution over ($P_h,P_l$) (208). This is because at first, the information model component does not have any information about whether the transaction in question, such as a deal, will be won or lost.

However, as reports of user-reported probabilities of a successful outcome are received, the Bayes rule can be used to update a belief on ($P_h,P_l$), conditioned on (i.e., based on) the reports (210). More specifically, once such a report has been received, and given the behavioral model component having the parameters ($\lambda,\gamma$), the probability of the report can be calculated, condition on the prior and the behavioral model component. As such, the Bayes rule permits the determination of the likelihood that the user has the information $P_h$ as compared to the information $P_l$.

The expectation of $(P_h, P_l)$ is then determined given the report and the parameters $(\lambda, \gamma)$ (212), and is recovered average probability $P_{rev}$ noted above. More specifically, $P_{rev} = aP_h + (1-a)P_l$. In this equation, a is the chance (i.e., probability) that the user has the information $P_h$, given the report. Thus, the example method 200 estimates a behavior and information model that can be used to yield a model-determined probability of a successful outcome that more accurately reflects the actual user-known (i.e., user-believed) probability of a successful outcome than the user-reported probability of a successful outcome does. The model-determined probability of a successful outcome is equal to $P_{rev}$, and is equal to the maximized likelihood.

Referring back to FIG. 1, then, the behavior and information model estimated in part 104 is used to yield a model-determined probability of a successful outcome (106), based on the report received in part 102. The model-determined probability of a successful outcome may be output (108). For instance, this probability may be recorded on a computer-readable data storage medium, for ultimate viewing on a display device and/or for ultimate printing by a printing device.

The example method 100 is periodically repeated (110), to receive further reports indicating user-reported probabilities of a successful outcome the transaction (e.g., the deal) in question. In general, each time a new or updated report is received in part 102, the behavior and information model is estimated again in part 104 to further improve the model. Thereafter, the improved behavior and information model is used to yield another model-determined probability of a successful outcome that is more accurate (106), and which may be output as before (108).

Figure 3:
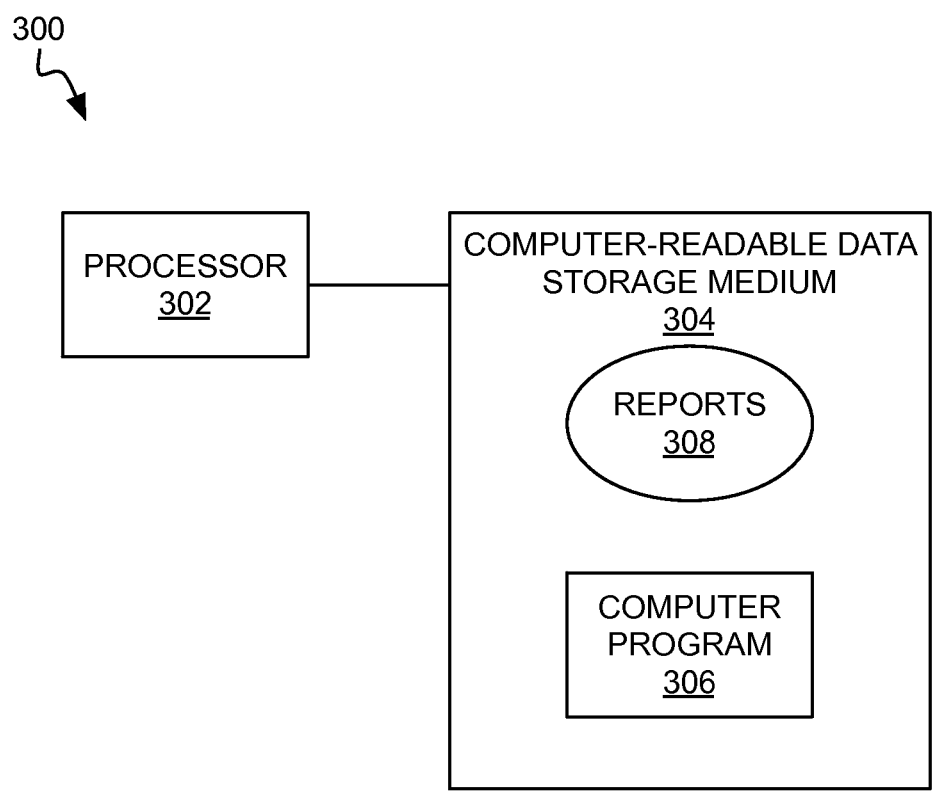
FIG. 3 is a diagram of an example system for determining a probability of a successful outcome that is more accurate than a user-reported probability of a successful outcome.

FIG. 3 shows an example system 300 in relation to which the example methods 100 and 200 can be implemented. The example system 300 may be implemented over one or more computing devices, such as desktop computers. The system 300 includes a processor 302 and a non-transitory computer-readable data storage medium 304, such as a semiconductor memory and/or a hard disk drive.

The computer-readable data storage medium 304 stores a computer program 306 as well as one or more reports 308 of user-reported probabilities of a successful outcome. The processor 302 thus executes the computer program 306 from the computer-readable data storage medium 304, resulting in performance of the example methods 100 and 200. As such, the reports 308 are utilized by the computer program 306 to yield model-determined probabilities of a successful outcome that are more accurate than the user-reported probabilities of a successful outcome within the reports 308.

The techniques disclosed herein have been largely described in relation to transactions that are deals that salespeople are pursuing, and for which the salespeople provide user-reported probabilities of a successful outcome. However, these techniques may be performed in relation to transactions other than sales-oriented deals. For example, the techniques may be performed in relation to estimating whether a project will be completed on-time, as well as other types of transactions.

We claim:

1. A method comprising:
receiving, by a processor, a report indicating a user-reported numeric probability of a successful outcome;
estimating, by the processor, a behavior and information model based on the report, the behavior and information model including a behavior model component having a bias parameter indicating user bias in providing the user-reported numeric probability and a consistency parameter indicating user consistency in providing the user-reported numeric probability, the behavior and information model including an information model component having a first user-believed probability of a successful outcome and a second user-believed probability of a successful outcome, where estimating the behavior and information model based on the report comprises employing a maximum likelihood technique that determines the bias parameter, the consistency parameter, the first user-believed probability of winning, and the second user believed probability of winning that maximize a likelihood; and,
using, by the processor, the behavior and information model to yield a model-determined numeric probability of a successful outcome that more accurately reflects a probability of a successful outcome than the user-reported numeric probability of a successful outcome does,
wherein the likelihood is the model-determined numeric probability of a successful outcome for an ultimate winning outcome, the bias parameter is determined based on an expected utility calculation, and the consistency parameter is determined using a probabilistic choice approach,
wherein the expected utility calculation involves a Brier scoring rule in which the user-reported numeric probability is subjected to a mathematical calculation,
and wherein the probabilistic choice approach models a bounded user rationality.

2. The method of claim 1, wherein the first user-believed probability of a successful outcome is unobservable and indicates an actual user-believed probability of a successful outcome for an ultimate winning outcome,
and wherein the second user-believed probability of a successful outcome is unobservable and indicates an actual user-believed probability of winning for an ultimate losing outcome.

3. The method of claim 2, wherein the first user-believed probability of a successful outcome is assumed constant, and the second user-believed probability of a successful outcome is assumed constant.

4. The method of claim 1, wherein one minus the likelihood is a model-determined numeric probability of a successful outcome for an ultimate losing outcome.

5. The method of claim 1, wherein estimating the behavior and information model further comprises inverting the behavior model component using a Bayesian approach.

6. The method of claim 5, wherein inverting the behavior model component using the Bayesian approach comprises:
starting with a maximum entropy prior having a uniform distribution over the first user believed probability of a successful outcome and the second user-believed probability of a successful outcome;
updating the first user-believed probability of a successful outcome and the second user believed probability of a successful outcome, based on the report received; and,
determining an expectation of the first user-believed probability of a successful outcome and the second user-believed probability of a successful outcome,
wherein the expectation is the model-determined numeric probability of a successful outcome for an ultimate winning outcome.

7. The method of claim 1, further comprising repeating the method in relation to an updated report, such that the behavior and information model is estimated again to improve the behavior and information model.

8. The method of claim 1, wherein the user-reported numeric probability of a successful outcome is a user-reported numeric probability of winning a sales deal, and wherein the model-determined numeric probability of winning is a model-determined numeric probability of winning the sales deal.

9. A non-transitory computer-readable data storage medium storing a computer program executable by a processor to perform a method comprising:
retrieving, by a processor, a report indicating a user-reported numeric probability of a successful outcome;
determining, by a processor, by the processor, a behavior and information model based on the report, the behavior and information model including a behavior model component having a bias parameter indicating user bias in providing the user-reported numeric probability and a consistency parameter indicating user consistency in providing the user-reported numeric probability, the behavior and information model including an information model component having a first user-believed probability of a successful outcome and a second user-believed probability of a successful outcome, where estimating the behavior and information model based on the report comprises employing a maximum likelihood technique that determines the bias parameter, the consistency parameter, the first user-believed probability of a successful outcome, and the second user-believed probability of a successful outcome that maximize a likelihood; and,
utilizing, by the processor, the behavior and information model to yield a model determined numeric probability of a successful outcome that more accurately reflects a probability of a successful outcome than the user-reported numeric probability of a successful outcome does,
wherein the likelihood is the model-determined numeric probability of a successful outcome for an ultimate winning outcome, the bias parameter is determined based on an expected utility calculation in relation to the user-reported numeric probability, and the consistency parameter is determined using a probabilistic choice approach modeling a bounded user rationality,
wherein the expected utility calculation involves a Brier scoring rule in which the user reported numeric probability is subjected to a mathematical calculation,
and wherein the probabilistic choice approach models a bounded user rationality.

10. The non-transitory computer-readable data storage medium of claim 9, wherein the bias parameter indicates a user bias in providing the user-reported numeric probability of a successful outcome, and the bias parameter is mathematically determined using the user-reported numeric probability, wherein the first user-believed probability of a successful outcome is unobservable and indicates an actual user-believed probability of a successful outcome for an ultimate winning outcome.

11. The non-transitory computer-readable data storage medium of claim 9, wherein determining the behavior and information model further inverting the behavior model component using a Bayesian approach.

12. The non-transitory computer-readable data storage medium of claim 9, wherein the method further comprises repeating the method in relation to an updated report, such that the behavior and information model is estimated again to improve the behavior and information model.

13. A system comprising:
a processor;
a computer-readable data storage medium to store a report indicating a user-reported numeric probability of a successful outcome, and to store a computer program,
wherein the computer program is executable by the processor to estimate a behavior and information model based on the report, and to employ the behavior and information model to yield a model-determined numeric probability of a successful outcome that more accurately reflects a probability of a successful outcome than the user-reported numeric probability of a successful outcome does,
wherein the behavior and information model includes a behavior model component having a bias parameter indicating user bias in providing the user-reported numeric probability and a consistency parameter indicating user consistency in providing the user-reported numeric probability,
wherein the behavior and information model includes an information model component having a first user-believed probability of a successful outcome and a second user-believed probability of a successful outcome,
wherein the behavior and information model is estimated based on the report by employing a maximum likelihood technique that determines the bias parameter, the consistency parameter, the first user-believed probability of a successful outcome, and the second user believed probability of a successful outcome that maximize a likelihood, the bias parameter mathematically determined using the user-reported numeric probability,
and wherein the likelihood is the model-determined numeric probability of a successful outcome for an ultimate winning outcome, the bias parameter is determined based on an expected utility calculation involving a Brier scoring rule in relation to the user-reported numeric probability, and the consistency parameter is determined using a probabilistic choice approach modeling a bounded user rationality.

* * * * *